United States Patent
Zalamea et al.

(10) Patent No.: US 9,267,010 B2
(45) Date of Patent: Feb. 23, 2016

(54) ROTOMOLDING COMPOSITION

(71) Applicants: Luis G. Zalamea, Richterswill (CH); Roberto Rigobello, Herrliberg (CH); Thomas T. Allgeuer, Wollerau (CH); Gerd Lohse, Rueschlikon (CH)

(72) Inventors: Luis G. Zalamea, Richterswill (CH); Roberto Rigobello, Herrliberg (CH); Thomas T. Allgeuer, Wollerau (CH); Gerd Lohse, Rueschlikon (CH)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/366,829

(22) PCT Filed: Dec. 20, 2012

(86) PCT No.: PCT/US2012/071088
§ 371 (c)(1),
(2) Date: Jun. 19, 2014

(87) PCT Pub. No.: WO2013/096696
PCT Pub. Date: Jun. 27, 2013

(65) Prior Publication Data
US 2014/0357776 A1   Dec. 4, 2014

Related U.S. Application Data

(60) Provisional application No. 61/577,752, filed on Dec. 20, 2011.

(51) Int. Cl.
*C08K 3/22* (2006.01)
(52) U.S. Cl.
CPC ........... *C08K 3/22* (2013.01); *C08K 2003/2265* (2013.01)

(58) Field of Classification Search
CPC .................... C08K 3/22; C08K 2003/2265
See application file for complete search history.

(56) References Cited

U.S. PATENT DOCUMENTS

| | | | |
|---|---|---|---|
| 5,002,608 A * | 3/1991 | Fujiwara et al. | 106/437 |
| 5,504,172 A | 4/1996 | Imuta et al. | |
| 5,919,295 A * | 7/1999 | Lamba et al. | 106/36 |
| 6,093,298 A * | 7/2000 | Kaylo et al. | 204/489 |
| 6,525,157 B2 | 2/2003 | Cozewith et al. | |
| 6,960,635 B2 | 11/2005 | Stevens et al. | |
| 7,696,265 B2 * | 4/2010 | Scharnke et al. | 523/200 |
| 2006/0199930 A1 | 9/2006 | Li Pi Shan et al. | |

FOREIGN PATENT DOCUMENTS

| | | |
|---|---|---|
| WO | 00/01745 A1 | 1/2000 |
| WO | 2005/090427 A2 | 9/2005 |
| WO | 2009/067337 A1 | 5/2009 |

OTHER PUBLICATIONS

Derwent abstract 1992-245765 for JP 04-164966 A, Jun. 10, 1992.*
Full English-language translation of JP 04-164966, Jun. 10, 1992.*

* cited by examiner

*Primary Examiner* — Vickey Nerangis

(57) ABSTRACT

The instant invention provides a rotomolding composition. The a rotomolding composition comprises at least 95 percent by weight of a thermoplastic polymer; and from 0.1 to 3 percent by weight of metal oxide lamellae; wherein the rotomolding composition is characterized by at least one of the following properties: (a) having a retention at elongation at break of at least 85 percent after 4000 hours of accelerated aging; or (b) having a ductility improvement of at least 50 percent relative to a similar composition free of said metal oxide lamellae.

3 Claims, 2 Drawing Sheets

40 μm

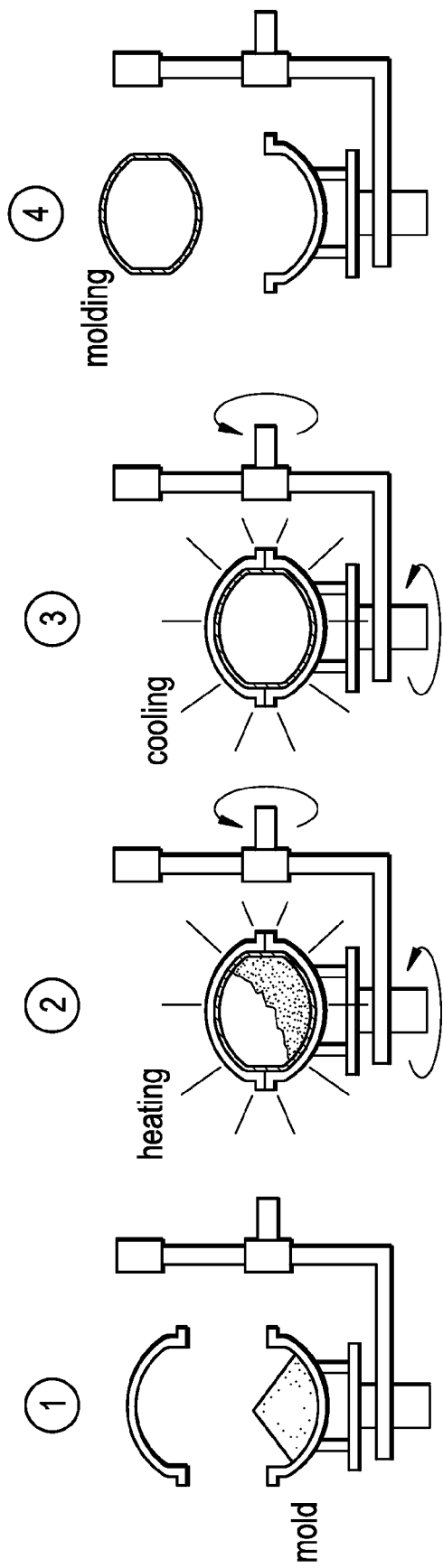

ROTOMOLDING COMPOSITION

FIELD OF INVENTION

The instant invention relates to a rotomolding composition.

BACKGROUND OF THE INVENTION

Ultraviolet resistance additives are critical for plastic parts that are exposed to harsh environmental conditions. Typical additive packages are designed to last a given amount of time, due to the fact that the active chemical species are consumed overtime. A parallel approach consists on blocking incoming light by means of a filler or opacifier. As side benefits, permeability can be enhanced due to blocking of the diffusing molecules. Additionally, mechanical properties can be improved via the addition of such mineral fillers. Mineral fillers such as iron oxide have been known and available as fillers for plastics and coatings for a long time; however, several side effects that can be traced back to impurities in such fillers have opposed their potential use. The availability of higher purity iron oxide can be used advantageously as a ultraviolet-blocking agent that can be used as a partial or total replacement of standard chemical ultraviolet-resistance additive packages.

SUMMARY OF THE INVENTION

The instant invention provides a rotomolding composition. The a rotomolding composition comprises at least 95 percent by weight of a thermoplastic polymer; and from 0.1 to 3 percent by weight of metal oxide lamellae; wherein the rotomolding composition is characterized by at least one of the following properties: (a) having a retention at elongation at break of at least 85 percent after 4000 hours of accelerated aging; or (b) having a ductility improvement of at least 50 percent relative to a similar composition free of said metal oxide lamellae.

BRIEF DESCRIPTION OF THE DRAWINGS

For the purpose of illustrating the invention, there is shown in the drawings a form that is exemplary; it being understood, however, that this invention is not limited to the precise arrangements and instrumentalities shown.

FIG. 4 is flow diagram illustrating the rotational molding process.

DETAILED DESCRIPTION OF THE INVENTION

Figure 1:
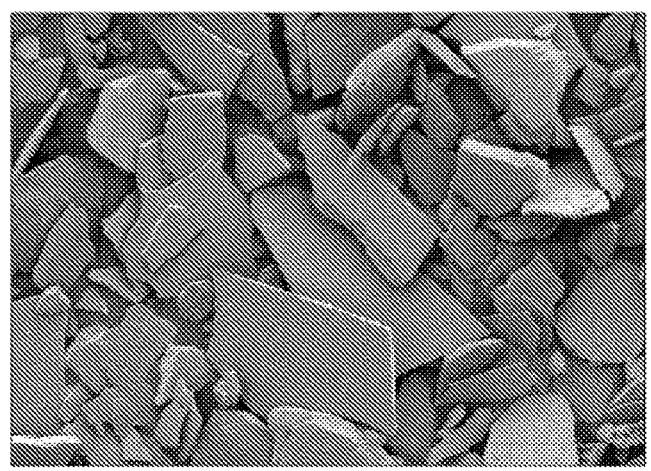
FIG. 1 is a first photograph of iron oxide lamellae.
Figure 2:
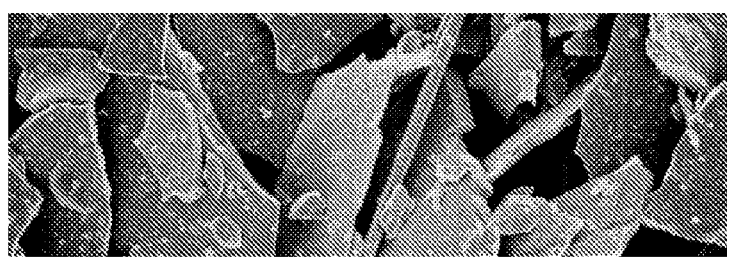
FIG. 2 is a second photograph of iron oxide lamellae.
Figure 3:
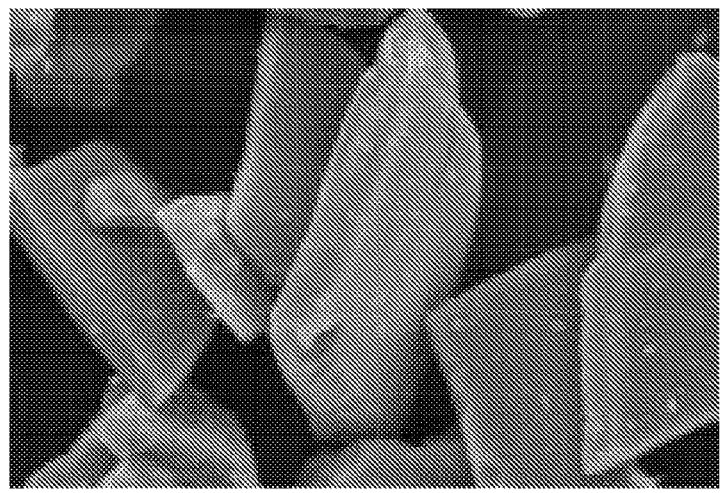
FIG. 3 is a third photograph of iron oxide lamellae.

The instant invention provides a rotomolding composition. The rotomolding composition comprises at least 95 percent by weight of a thermoplastic polymer; and from 0.1 to 3 percent by weight of metal oxide lamellae; wherein the rotomolding composition is characterized by at least one of the following properties: (a) having a retention at elongation at break of at least 85 percent after 4000 hours of accelerated aging; or (b) having a ductility improvement of at least 50 percent relative to a similar composition free of said metal oxide lamellae.

The rotomolding composition may be characterized by having a retention at elongation at break of at least 85 percent, for example at a least 90 percent, after 4000 hours of accelerated aging. The rotomolding composition may also be characterized by having a ductility improvement of at least 50 percent, for example at least 60 percent, relative to a similar composition free of said metal oxide lamellae. Additionally, the rotomolding composition may further be characterized by having a tensile modulus (2%) improvement of at least 10 percent relative to a similar composition free of said metal oxide lamellae.

The rotomolding composition comprises at least 95 percent by weight of a thermoplastic polymer, for example, at least 96 weight percent, or at least 97 weight percent, or at least 98 weight percent, or at least 99 weight percent.

Such thermoplastic polymers (materials) include, but are not limited to, polyolefin, e.g. polyethylene and polypropylene; polyamide, e.g. nylon 6; polyvinylidene chloride; polyvinylidene fluoride; polycarbonate; polystyrene; polyethylene terephthalate; polyester, and polyurethanes.

Examples of thermoplastic materials include, but are not limited to, homopolymers and copolymers (including elastomers) of one or more alpha-olefins such as ethylene, propylene, 1-butene, 3-methyl-1-butene, 4-methyl-1-pentene, 3-methyl-1-pentene, 1-heptene, 1-hexene, 1-octene, 1-decene, and 1-dodecene, as typically represented by polyethylene, polypropylene, poly-1-butene, poly-3-methyl-1-butene, poly-3-methyl-1-pentene, poly-4-methyl-1-pentene, ethylene-propylene copolymer, ethylene-1-butene copolymer, and propylene-1-butene copolymer; copolymers (including elastomers) of an alpha-olefin with a conjugated or non-conjugated diene, as typically represented by ethylene-butadiene copolymer and ethylene-ethylidene norbornene copolymer; and polyolefins (including elastomers) such as copolymers of two or more alpha-olefins with a conjugated or non-conjugated diene, as typically represented by ethylene-propylene-butadiene copolymer, ethylene-propylene-dicyclopentadiene copolymer, ethylene-propylene-1,5-hexadiene copolymer, and ethylene-propylene-ethylidene norbornene copolymer; ethylene-vinyl compound copolymers such as ethylene-vinyl acetate copolymer, ethylene-vinyl alcohol copolymer, ethylene-vinyl chloride copolymer, ethylene acrylic acid or ethylene-(meth)acrylic acid copolymers, and ethylene-(meth)acrylate copolymer; styrenic copolymers (including elastomers) such as polystyrene, ABS, acrylonitrile-styrene copolymer, α-methylstyrene-styrene copolymer, styrene vinyl alcohol, styrene acrylates such as styrene methylacrylate, styrene butyl acrylate, styrene butyl methacrylate, and styrene butadienes and crosslinked styrene polymers; and styrene block copolymers (including elastomers) such as styrene-butadiene copolymer and hydrate thereof, and styrene-isoprene-styrene triblock copolymer; polyvinyl compounds such as polyvinyl chloride, polyvinylidene chloride, vinyl chloride-vinylidene chloride copolymer, polymethyl acrylate, and polymethyl methacrylate; polyamides such as nylon 6, nylon 6,6, and nylon 12; thermoplastic polyesters such as polyethylene terephthalate and polybutylene terephthalate; polyurethane; polycarbonate, polyphenylene oxide, and the like; and glassy hydrocarbon-based resins, including poly-dicyclopentadiene polymers and related polymers (copolymers, terpolymers); saturated mono-olefins such as vinyl acetate, vinyl propionate, vinyl versatate, and vinyl butyrate and the like; vinyl esters such as esters of monocarboxylic acids, including methyl acrylate, ethyl acrylate, n-butyl acrylate, isobutyl acrylate, 2-ethylhexyl acrylate, dodecyl acrylate, n-octyl acrylate, phenyl acrylate, methyl methacrylate, ethyl methacrylate, and butyl methacrylate and the like; acrylonitrile, methacrylonitrile, acrylamide, mixtures thereof; resins produced by ring opening metathesis and cross metathesis polymerization and the like. These resins may be used either alone or in combinations of two or more.

In selected embodiments, thermoplastic material may, for example, comprise one or more polyolefins selected from the group consisting of ethylene-alpha olefin copolymers, propylene-alpha olefin copolymers, and olefin block copolymers. In particular, in select embodiments, the thermoplastic material may comprise one or more non-polar polyolefins.

In specific embodiments, polyolefins such as polypropylene, polyethylene, copolymers thereof, and blends thereof, as well as ethylene-propylene-diene terpolymers, may be used. In some embodiments, exemplary olefinic polymers include homogeneous polymers; high density polyethylene (HDPE); heterogeneously branched linear low density polyethylene (LLDPE); heterogeneously branched ultra low linear density polyethylene (ULDPE); homogeneously branched, linear ethylene/alpha-olefin copolymers; homogeneously branched, substantially linear ethylene/alpha-olefin polymers; and high pressure, free radical polymerized ethylene polymers and copolymers such as low density polyethylene (LDPE) or ethylene vinyl acetate polymers (EVA).

In one embodiment, the ethylene-alpha olefin copolymer may, for example, be ethylene-butene, ethylene-hexene, or ethylene-octene copolymers or interpolymers. In other particular embodiments, the propylene-alpha olefin copolymer may, for example, be a propylene-ethylene or a propylene-ethylene-butene copolymer or interpolymer.

In certain other embodiments, the thermoplastic material may, for example, be a semi-crystalline polymer and may have a melting point of less than 110° C. In another embodiment, the melting point may be from 25 to 100° C. In another embodiment, the melting point may be between 40 and 85° C.

In one particular embodiment, the thermoplastic material is a propylene/α-olefin interpolymer composition comprising a propylene/alpha-olefin copolymer, and optionally one or more polymers, e.g. a random copolymer polypropylene (RCP). In one particular embodiment, the propylene/alpha-olefin copolymer is characterized as having substantially isotactic propylene sequences. "Substantially isotactic propylene sequences" means that the sequences have an isotactic triad (mm) measured by $^{13}$C NMR of greater than about 0.85; in the alternative, greater than about 0.90; in another alternative, greater than about 0.92; and in another alternative, greater than about 0.93. Isotactic triads are well-known in the art and are described in, for example, U.S. Pat. No. 5,504,172 and International Publication No. WO 00/01745, which refer to the isotactic sequence in terms of a triad unit in the copolymer molecular chain determined by $^{13}$C NMR spectra.

The propylene/alpha-olefin copolymer may have a melt flow rate in the range of from 0.1 to 500 g/10 minutes, measured in accordance with ASTM D-1238 (at 230° C./2.16 Kg). All individual values and subranges from 0.1 to 500 g/10 minutes are included herein and disclosed herein; for example, the melt flow rate can be from a lower limit of 0.1 g/10 minutes, 0.2 g/10 minutes, or 0.5 g/10 minutes to an upper limit of 500 g/10 minutes, 200 g/10 minutes, 100 g/10 minutes, or 25 g/10 minutes. For example, the propylene/alpha-olefin copolymer may have a melt flow rate in the range of from 0.1 to 200 g/10 minutes; or in the alternative, the propylene/alpha-olefin copolymer may have a melt flow rate in the range of from 0.2 to 100 g/10 minutes; or in the alternative, the propylene/alpha-olefin copolymer may have a melt flow rate in the range of from 0.2 to 50 g/10 minutes; or in the alternative, the propylene/alpha-olefin copolymer may have a melt flow rate in the range of from 0.5 to 50 g/10 minutes; or in the alternative, the propylene/alpha-olefin copolymer may have a melt flow rate in the range of from 1 to 50 g/10 minutes; or in the alternative, the propylene/alpha-olefin copolymer may have a melt flow rate in the range of from 1 to 40 g/10 minutes; or in the alternative, the propylene/alpha-olefin copolymer may have a melt flow rate in the range of from 1 to 30 g/10 minutes.

The propylene/alpha-olefin copolymer has a crystallinity in the range of from at least 1 percent by weight (a heat of fusion of at least 2 Joules/gram) to 30 percent by weight (a heat of fusion of less than 50 Joules/gram). All individual values and subranges from 1 percent by weight (a heat of fusion of at least 2 Joules/gram) to 30 percent by weight (a heat of fusion of less than 50 Joules/gram) are included herein and disclosed herein; for example, the crystallinity can be from a lower limit of 1 percent by weight (a heat of fusion of at least 2 Joules/gram), 2.5 percent (a heat of fusion of at least 4 Joules/gram), or 3 percent (a heat of fusion of at least 5 Joules/gram) to an upper limit of 30 percent by weight (a heat of fusion of less than 50 Joules/gram), 24 percent by weight (a heat of fusion of less than 40 Joules/gram), 15 percent by weight (a heat of fusion of less than 24.8 Joules/gram) or 7 percent by weight (a heat of fusion of less than 11 Joules/gram). For example, the propylene/alpha-olefin copolymer may have a crystallinity in the range of from at least 1 percent by weight (a heat of fusion of at least 2 Joules/gram) to 24 percent by weight (a heat of fusion of less than 40 Joules/gram); or in the alternative, the propylene/alpha-olefin copolymer may have a crystallinity in the range of from at least 1 percent by weight (a heat of fusion of at least 2 Joules/gram) to 15 percent by weight (a heat of fusion of less than 24.8 Joules/gram); or in the alternative, the propylene/alpha-olefin copolymer may have a crystallinity in the range of from at least 1 percent by weight (a heat of fusion of at least 2 Joules/gram) to 7 percent by weight (a heat of fusion of less than 11 Joules/gram); or in the alternative, the propylene/alpha-olefin copolymer may have a crystallinity in the range of from at least 1 percent by weight (a heat of fusion of at least 2 Joules/gram) to 5 percent by weight (a heat of fusion of less than 8.3 Joules/gram). The crystallinity is measured via DSC method. The propylene/alpha-olefin copolymer comprises units derived from propylene and polymeric units derived from one or more alpha-olefin comonomers. Exemplary comonomers utilized to manufacture the propylene/alpha-olefin copolymer are $C_2$, and $C_4$ to $C_{10}$ alpha-olefins; for example, $C_2$, $C_4$, $C_6$ and $C_8$ alpha-olefins.

The propylene/alpha-olefin copolymer comprises from 1 to 40 percent by weight of one or more alpha-olefin comonomers. All individual values and subranges from 1 to 40 weight percent are included herein and disclosed herein; for example, the comonomer content can be from a lower limit of 1 weight percent, 3 weight percent, 4 weight percent, 5 weight percent, 7 weight percent, or 9 weight percent to an upper limit of 40 weight percent, 35 weight percent, 30 weight percent, 27 weight percent, 20 weight percent, 15 weight percent, 12 weight percent, or 9 weight percent. For example, the propylene/alpha-olefin copolymer comprises from 1 to 35 percent by weight of one or more alpha-olefin comonomers; or in the alternative, the propylene/alpha-olefin copolymer comprises from 1 to 30 percent by weight of one or more alpha-olefin comonomers; or in the alternative, the propylene/alpha-olefin copolymer comprises from 3 to 27 percent by weight of one or more alpha-olefin comonomers; or in the alternative, the propylene/alpha-olefin copolymer comprises from 3 to 20 percent by weight of one or more alpha-olefin comonomers; or in the alternative, the propylene/alpha-olefin copolymer comprises from 3 to 15 percent by weight of one or more alpha-olefin comonomers.

The propylene/alpha-olefin copolymer has a molecular weight distribution (MWD), defined as weight average molecular weight divided by number average molecular weight ($M_w/M_n$) of 3.5 or less; in the alternative 3.0 or less; or in another alternative from 1.8 to 3.0.

Such propylene/alpha-olefin copolymers are further described in details in the U.S. Pat. Nos. 6,960,635 and 6,525,157, incorporated herein by reference. Such propylene/alpha-olefin copolymers are commercially available from The Dow Chemical Company, under the tradename VERSIFY™, or from ExxonMobil Chemical Company, under the tradename VISTAMAXX™.

In one embodiment, the propylene/alpha-olefin copolymers are further characterized as comprising (A) between 60 and less than 100, preferably between 80 and 99 and more preferably between 85 and 99, weight percent units derived from propylene, and (B) between greater than zero and 40, preferably between 1 and 20, more preferably between 4 and 16 and even more preferably between 4 and 15, weight percent units derived from at least one of ethylene and/or a $C_{4-10}$ α-olefin; and containing an average of at least 0.001, preferably an average of at least 0.005 and more preferably an average of at least 0.01, long chain branches/1000 total carbons. The maximum number of long chain branches in the propylene/alpha-olefin copolymer is not critical, but typically it does not exceed 3 long chain branches/1000 total carbons. The term long chain branch, as used herein with regard to propylene/alpha-olefin copolymers, refers to a chain length of at least one (1) carbon more than a short chain branch, and short chain branch, as used herein with regard to propylene/alpha-olefin copolymers, refers to a chain length of two (2) carbons less than the number of carbons in the comonomer. For example, a propylene/1-octene interpolymer has backbones with long chain branches of at least seven (7) carbons in length, but these backbones also have short chain branches of only six (6) carbons in length. Such propylene/alpha-olefin copolymers are further described in details in the U.S. Provisional Patent Application No. 60/988,999 and International Patent Application No. PCT/US08/082599, each of which is incorporated herein by reference.

In certain other embodiments, the thermoplastic material, e.g. propylene/alpha-olefin copolymer, may, for example, be a semi-crystalline polymer and may have a melting point of less than 110° C. In preferred embodiments, the melting point may be from 25 to 100° C. In more preferred embodiments, the melting point may be between 40 and 85° C.

In other selected embodiments, olefin block copolymers, e.g., ethylene multi-block copolymer, such as those described in the International Publication No. WO2005/090427 and U.S. Patent Application Publication No. US 2006/0199930, incorporated herein by reference to the extent describing such olefin block copolymers and the test methods for measuring those properties listed below for such polymers, may be used as the thermoplastic material. Such olefin block copolymer may be an ethylene/α-olefin interpolymer:

(a) having a $M_w/M_n$ from about 1.7 to about 3.5, at least one melting point, $T_m$, in degrees Celsius, and a density, d, in grams/cubic centimeter, wherein the numerical values of $T_m$ and d corresponding to the relationship:

$$T_m > -2002.9 + 4538.5(d) - 2422.2(d)^2; \text{ or}$$

(b) having a $M_w/M_n$ from about 1.7 to about 3.5, and being characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH having the following relationships:

$$\Delta T > -0.1299(\Delta H) + 62.81 \text{ for } \Delta H \text{ greater than zero and up to 130 J/g,}$$

$$\Delta T > 48° \text{ C. for } \Delta H \text{ greater than 130 J/g,}$$

wherein the CRYSTAF peak being determined using at least 5 percent of the cumulative polymer, and if less than 5 percent of the polymer having an identifiable CRYSTAF peak, then the CRYSTAF temperature being 30° C.; or (c) being characterized by an elastic recovery, Re, in percent at 300 percent strain and 1 cycle measured with a compression-molded film of the ethylene/α-olefin interpolymer, and having a density, d, in grams/cubic centimeter, wherein the numerical values of Re and d satisfying the following relationship when ethylene/α-olefin interpolymer being substantially free of a cross-linked phase:

$$Re > 1481 - 1629(d); \text{ or}$$

(d) having a molecular fraction which elutes between 40° C. and 130° C. when fractionated using TREF, characterized in that the fraction having a molar comonomer content of at least 5 percent higher than that of a comparable random ethylene interpolymer fraction eluting between the same temperatures, wherein said comparable random ethylene interpolymer having the same comonomer(s) and having a melt index, density, and molar comonomer content (based on the whole polymer) within 10 percent of that of the ethylene/α-olefin interpolymer; or (e) having a storage modulus at 25° C., G' (25° C.), and a storage modulus at 100° C., G' (100° C.), wherein the ratio of G' (25° C.) to G' (100° C.) being in the range of about 1:1 to about 9:1.

Such olefin block copolymer, e.g. ethylene/α-olefin interpolymer may also:

(a) have a molecular fraction which elutes between 40° C. and 130° C. when fractionated using TREF, characterized in that the fraction having a block index of at least 0.5 and up to about 1 and a molecular weight distribution, $M_w/M_n$, greater than about 1.3; or (b) have an average block index greater than zero and up to about 1.0 and a molecular weight distribution, $M_w/M_n$, greater than about 1.3.

The thermoplastic polymers (materials) can further include glass or carbon fibers and/or any other mineral fillers such talc or calcium carbonate. Exemplary fillers include, but are not limited to, natural calcium carbonates, including chalks, calcites and marbles, synthetic carbonates, salts of magnesium and calcium, dolomites, magnesium carbonate, zinc carbonate, lime, magnesia, barium sulphate, barite, calcium sulphate, silica, magnesium silicates, talc, wollastonite, clays and aluminum silicates, kaolins, mica, glass or carbon fiber or powder, wood fiber or powder or mixtures of these compounds. The thermoplastic polymers (materials) can further include one or more antistatic agents, color enhancers, dyes, lubricants, pigments, primary antioxidants, secondary antioxidants, processing aids, and combinations thereof. The thermoplastic polymer (material) may comprise from about 0 to about 10 percent by the combined weight of such additives, based on the weight of the thermoplastic material and such additives.

The rotomolding composition comprises from 0.1 to 3 percent by weight of metal oxide lamellae. The metal oxide is preferably iron oxide, for example iron (III) oxide ($Fe_2O_3$). Exemplary iron oxides have a purity level of 99 percent or greater. In addition, the iron oxide may have a density of approximately 4800 kg/m$^3$. The iron oxide may have a hardness in the range of 6 to 6.5 Mohs. The lamellae have an average diameter size (long axis) in the range of from 2 to 30

μM, and an average aspect ratio (long axis/thickness) in the range of from 2 to 30. Such metal oxide lamellae are available under the tradename MIOX from karntner Montanindustrie.

The rotomolding composition of the present invention is preferably formed into an article via rotational molding process. Products that can be manufactured using rotational molding process include storage tanks, bins and refuse containers, airplane parts, doll parts, road cones, footballs, helmets, rowing boats and kayak hulls, and playground slides and roofs. Designs can also be multi-wall, either hollow or foam filled.

The rotational molding process includes in four steps, as illustrated in FIG. 4. A given amount of the inventive rotomolding composition, either in powder or liquid form, is deposited in a mold. The mold is closed and rotated biaxially in an oven. The inventive rotomolding composition melts and forms a coating over the inner surface of the mold. The mold is removed from the oven and introduced into a cooling area, and finally the mold is opened and the hollow part is removed.

EXAMPLES

The following examples illustrate the present invention but are not intended to limit the scope of the invention.

Inventive 1-3

Inventive composition 1 comprises 0.2 percent by weight of MIOX and 99.8 percent of DOWLEX™ NG2432.10UE, an ethylene/α-olefin copolymer having a density of 0.939 g/cm$^3$ and melt index ($I_2$) of 3.8 g/10 minutes, which is available for The Dow Chemical Company. Inventive composition 1 was formed into a 22 cm side cube test mold. Properties of one side wall were tested, and the results are reported in Tables 1 and 2.

Inventive composition 2 comprises 0.5 percent by weight of MIOX and 99.5 percent of DOWLEX™ NG2432.10UE an ethylene/α-olefin copolymer having a density of 0.939 g/cm$^3$ and melt index ($I_2$) of 3.8 g/10 minutes, which is available for The Dow Chemical Company. Inventive composition 2 was formed into a 22 cm side cube test mold. Properties of one side wall were tested, and the results are reported in Tables 1 and 2.

Inventive composition 3 comprises 1.0 percent by weight of MIOX and 99 percent of DOWLEX™ NG2432.10UE, an ethylene/α-olefin copolymer having a density of 0.939 g/cm$^3$ and melt index ($I_2$) of 3.8 g/10 minutes, which is available for The Dow Chemical Company. Inventive composition 3 was formed into a 22 cm side cube test mold. Properties of one side wall were tested, and the results are reported in Tables 1 and 2.

Comparative 1-2

Comparative composition 1 comprises 100 percent by weight of DOWLEX™ NG2432.10UE, an ethylene/α-olefin copolymer having a density of 0.939 g/cm$^3$ and melt index ($I_2$) of 3.8 g/10 minutes, which is available for The Dow Chemical Company. Comparative composition 1 was formed into a 22 cm side cube test mold. Properties of one side wall were tested, and the results are reported in Tables 1 and 2.

Comparative composition 2 comprises 5.0 percent by weight of MIOX and 95 percent of DOWLEX™ NG2432.10UE, an ethylene/α-olefin copolymer having a density of 0.939 g/cm$^3$ and melt index ($I_2$) of 3.8 g/10 minutes, which is available for The Dow Chemical Company. Comparative composition 2 was formed into a 22 cm side cube test mold. Properties of one side wall were tested, and the results are reported in Tables 1 and 2.

TABLE 1

| | | % Retention | |
|---|---|---|---|
| Sample No. | Metal Oxide | 2000 h | 4000 h |
| Comparative 1 | NG2432.10UE | 83% | 81% |
| Inventive 1 | +0.2% MIOX | 84% | 88% |
| Inventive 2 | +0.5% MIOX | 91% | 85% |
| Inventive 3 | +1.0% MIOX | 102% | 104% |
| Comparative 2 | +5.0% MIOX | 85% | 57% |

TABLE 2

| Sample No. | Metal Oxide | Etotal/Thickness | % Improvement |
|---|---|---|---|
| Comparative 1 | NG2432.10UE | 9.3 | 0.0% |
| Inventive 1 | +0.2% MIOX | 15.2 | 63.4% |
| Inventive 2 | +0.5% MIOX | 15.2 | 63.4% |
| Inventive 3 | +1.0% MIOX | 12.5 | 34.4% |
| Comparative 2 | +5.0% MIOX | 3.2 | −65.6% |

Test Methods

Test methods include the following:

Retained elongation (after aging) was measured according to Norm EN13341 Annex A, parts A.1. and A.2.

Compression molding was conducted according to ISO 293:2005.

Tensile strength was measured via ISO 527-2:1996

Weathering was measured according to ISO 4892-2

Impact Strength was measured according to ISO 6603-2 without any lubrication on the Striker.

The present invention may be embodied in other forms without departing from the spirit and the essential attributes thereof, and, accordingly, reference should be made to the appended claims, rather than to the foregoing specification, as indicating the scope of the invention.

We claim:

1. A rotomolding composition comprising:
   at least 95 percent by weight of a thermoplastic polymer; and
   from 0.1 to 3 percent by weight of iron oxide lamellae having a purity of at least 99 percent or greater, a hardness in the range of 6 to 6.5 Mohs, and an average aspect ratio (long axis/thickness) in the range of from 2 to 30 and wherein said iron oxide lamella has an average size diameter (long axis) in the range of from 2 to 20 μM;
   wherein said rotomolding composition is characterized by at least one of the following properties:
   (a) having a retention at elongation at break of at least 85 percent after 4000 hours of accelerated aging; or
   (b) having a ductility improvement of at least 50 percent relative to a similar composition free of said iron oxide lamellae.

2. The rotomolding composition according to claim 1, wherein said rotomolding composition is further characterized by having a tensile modulus (2%) improvement of at least 10 percent relative to a similar composition free of said iron oxide lamellae.

3. The rotomolding composition of claim 1, wherein said thermoplastic polymer is an ethylene based polymer or a propylene based polymer.

\* \* \* \* \*